(12) United States Patent
Lim et al.

(10) Patent No.: US 8,379,027 B2
(45) Date of Patent: Feb. 19, 2013

(54) RENDERING ENGINE TEST SYSTEM

(75) Inventors: Chee Boon Lim, Milton (AU);
Satyabrata Maitra, West Bengal (IN);
Amanpreet Singh Brar, Punjab (IN)

(73) Assignee: Red Hat, Inc., Raleigh, NC (US)

( * ) Notice: Subject to any disclaimer, the term of this patent is extended or adjusted under 35 U.S.C. 154(b) by 767 days.

(21) Appl. No.: 11/820,995

(22) Filed: Jun. 20, 2007

(65) Prior Publication Data
US 2008/0317347 A1 Dec. 25, 2008

(51) Int. Cl.
*G06T 11/00* (2006.01)
*G06F 17/00* (2006.01)

(52) U.S. Cl. ......... 345/467; 715/221; 715/222; 715/780

(58) Field of Classification Search .......... 382/309–311; 345/467; 715/221, 222, 780
See application file for complete search history.

(56) References Cited

U.S. PATENT DOCUMENTS

| | | | |
|---|---|---|---|
| 5,191,640 A * | 3/1993 | Plass | 358/1.13 |
| 5,257,323 A * | 10/1993 | Melen et al. | 382/310 |
| 5,621,818 A * | 4/1997 | Tashiro | 382/227 |
| 5,625,711 A * | 4/1997 | Nicholson et al. | 382/224 |
| 6,529,612 B1 * | 3/2003 | Gester et al. | 382/100 |
| 6,603,478 B1 * | 8/2003 | Kuo et al. | 345/467 |
| 6,694,045 B2 * | 2/2004 | Chung et al. | 382/119 |
| 2003/0076518 A1 * | 4/2003 | Miyake et al. | 358/1.9 |
| 2003/0113021 A1 * | 6/2003 | Shiotani | 382/209 |
| 2004/0223648 A1 * | 11/2004 | Hoene et al. | 382/218 |
| 2005/0057440 A1 * | 3/2005 | Naimer et al. | 345/8 |
| 2006/0110045 A1 * | 5/2006 | Reissman | 382/203 |
| 2006/0274349 A1 * | 12/2006 | Takeichi | 358/1.13 |
| 2007/0153708 A1 * | 7/2007 | Dominick et al. | 370/254 |
| 2008/0012856 A1 * | 1/2008 | Yu et al. | 345/424 |
| 2008/0240567 A1 * | 10/2008 | Chaoweeraprasit et al. | 382/182 |

\* cited by examiner

*Primary Examiner* — Michelle L Sams
(74) *Attorney, Agent, or Firm* — Lowenstein Sandler LLP (57) ABSTRACT

A system to compare a reference image of a text character, word or phrase with another image of the character, word or phrase that was rendered by a text rendering engine. Differences between the reference image and the rendered image may be recorded for subsequent analysis. Performance of a text rendering engine producing text according to typographical rules applicable to a natural language can be evaluated by one with no knowledge or ability to read the natural language.

18 Claims, 8 Drawing Sheets

RENDERING ENGINE TEST SYSTEM

FIELD

The invention relates to internationalization of computer interfaces. More specifically, the invention relates to testing complex text layout ("CTL") rendering systems.

BACKGROUND

As computer systems are deployed into more environments around the world, it becomes imperative that they support a wider range of interface languages. Many natural languages have complex sets of rules for displaying correctly-formatted written text. Furthermore, these rules (and their corresponding languages) may be unfamiliar to developers who produce software to deal with text, and to testers who confirm that the software is operating correctly.

When the written text is largely composed of familiar letter shapes and obeys rules that are not exceedingly complicated, development and testing can proceed relatively smoothly. For example, a German speaker may not be able to read Norwegian, but the alphabets share most characters, and written texts use common left-to-right character placement. Therefore, the German speaker could easily examine a sample of Norwegian text and pick out characters that seem to be oddly-shaped or out of place.

As the letter shapes become less familiar, and as writing rules become more complicated, it becomes increasingly difficult for one who cannot read the language to work on systems that are to process it. For example, the Cyrillic alphabet contains many characters unfamiliar to speakers of Latin-based alphabets, although most of the typesetting rules are unexceptional. Asian languages contain even more unfamiliar characters, and may also be written in vertical columns arranged from right to left.

Even further from left-to-right Latin alphabets along the spectrum of written text, Arabic and Indic languages use unfamiliar characters, often written right-to-left, and require that many characters be displayed differently depending on their position within a word (e.g., at the beginning, middle or end). Character shapes may also change according to neighboring characters. In typesetting parlance, these shape-changing characters are called "contextual forms." In a simple example familiar to readers of Latin-based alphabets, when the two characters 'f' and 'i' occur next to each other, they may be replaced with the single combined form 'fi,' as shown in the word "finger." (Note that the cross-bar of the 'f' is connected to the 'i,' and the dot of the 'i' has disappeared.) Similarly, in German, when two 's' characters appear in succession, they are sometimes replaced by the single glyph 'β:' "grüßen" (to greet). However, in Arabic and Indic languages, contextual forms may depend on five, six or more surrounding characters, and the replacement form may bear little resemblance to the succession of glyphs corresponding to the individual characters standing alone. Languages with complex typographical rules include (without limitation): Assamese, Bengali, Bodo, Dogri, Gujarati, Kannada, Kashmiri, Konkani, Maithill, Malayalam, Manipuri, Marathi, Nepali, Oriya, Punjabi, Sanskrit, Santhali, Sindhi, Tamil, Telugu, Urdu and Hindi.

It can be very difficult for someone who has not learned to read one of these languages to examine text written in the language and pick out even the most egregious typesetting errors. Therefore, development and testing of complex text layout systems may be time-consuming and expensive. A system to assist or automate text rendering engine testing may be of considerable value.

BRIEF DESCRIPTION OF DRAWINGS

Embodiments of the invention are illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

DETAILED DESCRIPTION

A system to test complex text layout ("CTL") rendering engines is described. The system may be used to assist a human in performing a series of tests, or it may be used to automatically test rendering engines and flag characters and character sequences that may have been rendered incorrectly. The system does not require its users to be familiar with the language being rendered. Procedures are strictly visual, and do not require any semantic comprehension. Embodiments of the invention can be used to test generic computer user interfaces, or the text display capabilities of more specialized devices such as cellular telephones and personal digital assistants ("PDAs").

Figure 1:
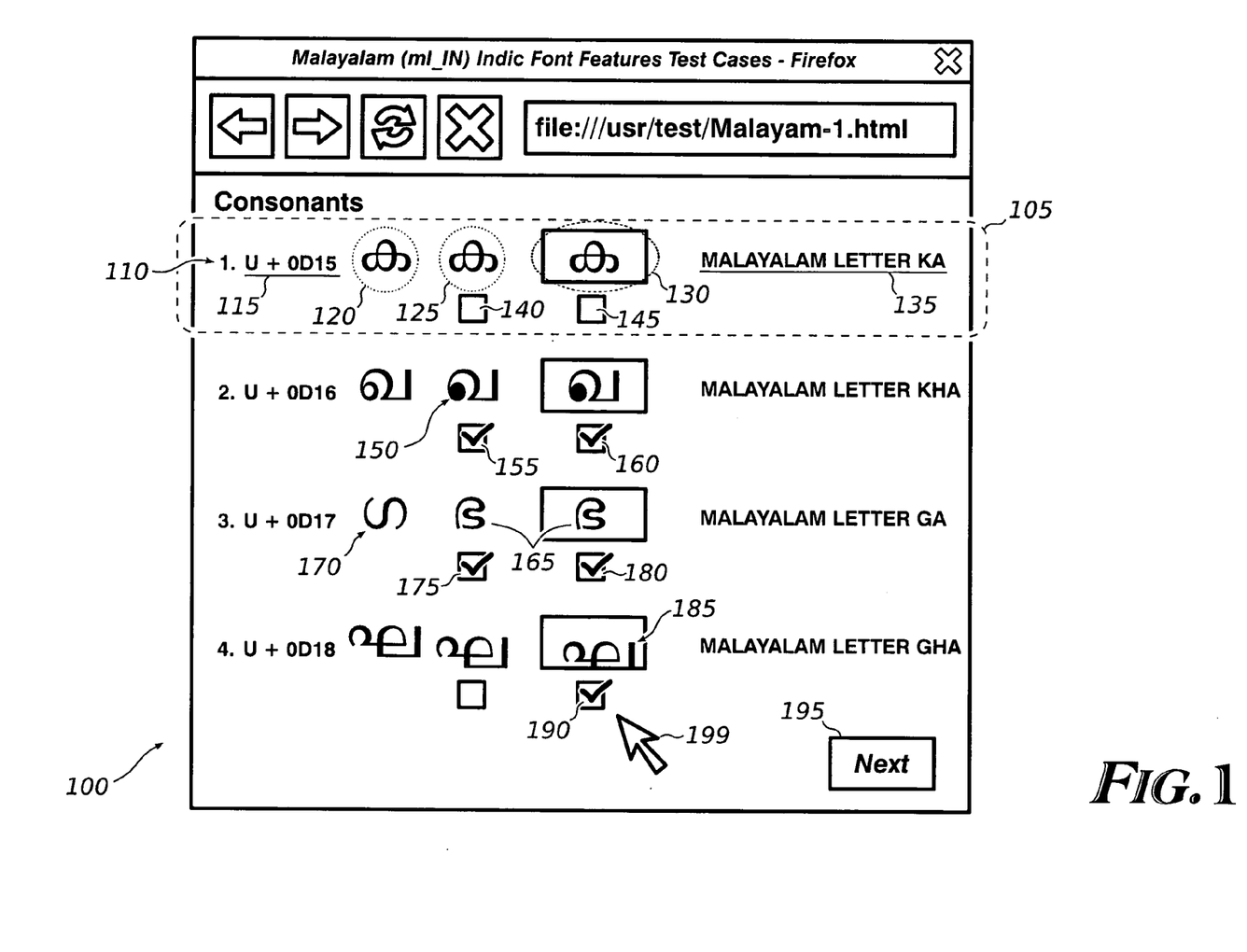
FIG. 1 shows a sample computer user interface produced by an embodiment of the invention.

FIG. 1 shows a sample display screen 100 produced by an embodiment of the invention to aid in manual testing of a text renderer. The display presents a plurality of rows 105, each row containing several individual pieces of information. An indexing aid 110 identifies the row, and a character code 115 specifies the character being presented. Element 120 is a reference image that shows what the rendered character should look like. The reference image is displayed directly from data stored elsewhere, as explained below; it is not rendered on-the-fly based on character code 115.

Elements 125 and 130 present the rendered character in two different contexts: as plain text (125) and in a text entry field (130). The rendering engine being tested (not shown in this Figure) produces elements 125 and 130 based on character code 115 and other information, and the rendered results are displayed near the reference image 120. A human-readable name of the character 135 may also be displayed for the operator's convenience.

Each row 105 also contains user-selectable Boolean controls 140 and 145 ("checkboxes") that can be activated if the operator detects a visual discrepancy between reference image 120 and one of plain-text rendering 125 or text-entry-field rendering 130. Several examples of visual discrepancies are shown in this figure. For example, the loop at the lower left of character 150 is filled in, while the corresponding reference image is open. Therefore, Boolean controls 155 and 160 have been activated. Similarly, characters 165 do not resemble their corresponding reference image 170, so Boolean controls 175 and 180 have been activated. Finally, character 185 does not fit properly in its text entry field (the lower portion of the character is cut off) so Boolean control 190 has been activated. Another user-selectable control 195 may be activated to submit the operator's evaluations of the presently-displayed characters and go on to another set of characters. Element 199 is a cursor of a user interface the operator may use to activate Boolean controls and the "submit" control 195.

Figure 2:
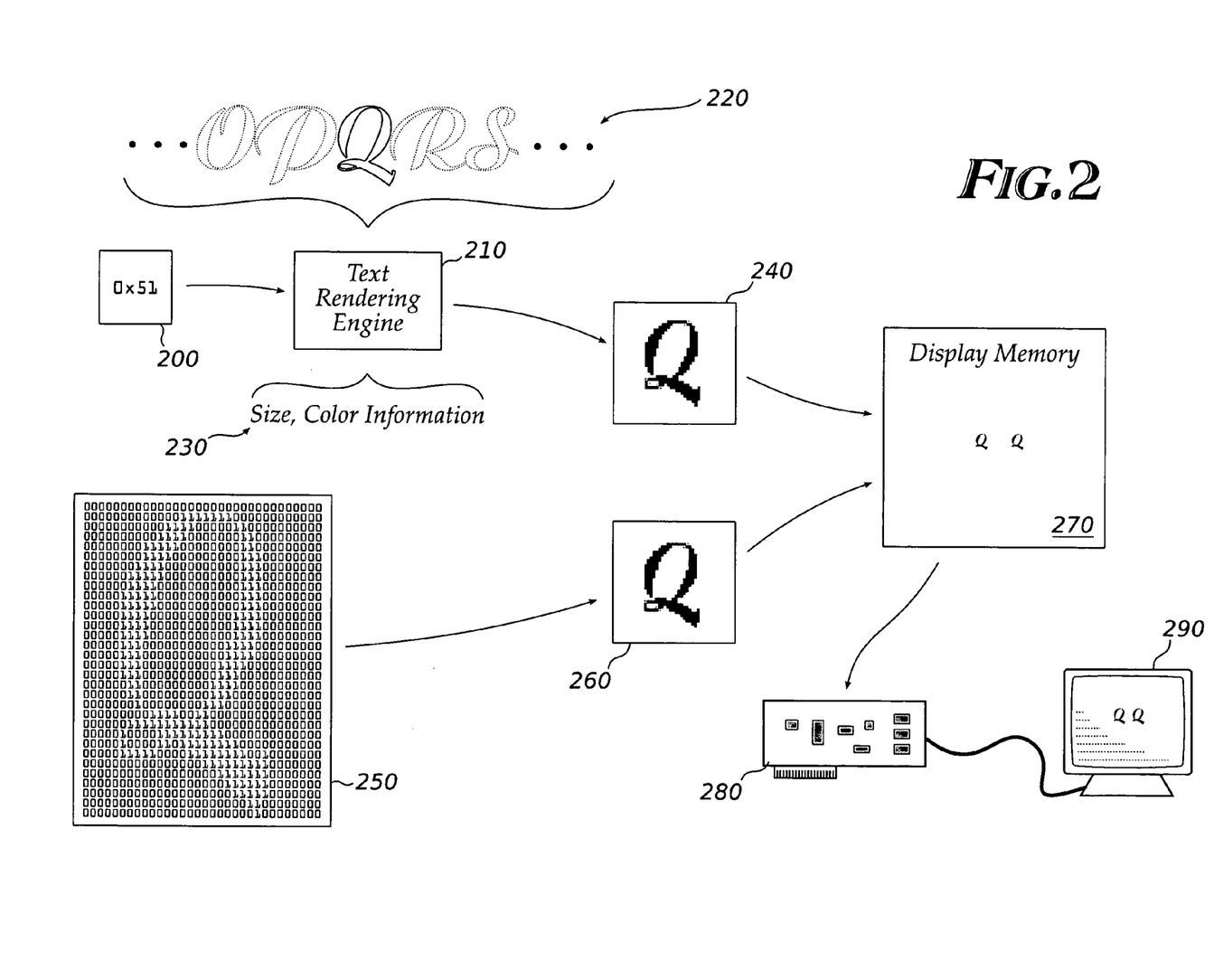
FIG. 2 illustrates data flows according to an embodiment.

FIG. 2 provides an overview of several data flows in an embodiment of the invention. First, a character code 200 is supplied to a text rendering engine 210. The text rendering engine refers to data such as an outline font description 220 and size, color (and other) information 230 to render an image 240 that corresponds to the character code 200. In this Figure, character code 0x51 corresponds to the letter 'Q' in the Latin alphabet. (This specification adopts the well-known convention of prefixing hexadecimal, or base-16, numbers with the characters "0x".)

Image 240 may be placed in a display memory 270 of a computer system, converted to a video signal by a graphics adapter 280, and eventually displayed on a monitor 290 for review by an operator.

Independently from the text rendering data pathway described above, a stored reference image 250 may be retrieved from a storage device (not shown) and converted to a form 260 that is suitable for placing in display memory 270. As shown here, the rendered character 240 and the reference image 260 may be presented near each other on the display 290.

Stored reference image 250 is depicted as an array of binary digits in this Figure, but other formats are commonly used in a typical computer system. For example, a reference image may be stored as a Graphics Interchange Format ("GIF") file, a Joint Photographic Experts Group ("JPEG") file, or a Portable Network Graphics ("PNG") file. These file formats encode an array of bits or pixels (a "raster") that represent the reference image. A reference image may also be stored in a scalable vector form, similar to an outline font. One well-known vector file format is called Scalable Vector Graphics ("SVG"). A vector reference image must be processed by a rendering engine (not shown) similar to text rendering image 210 to produce an image 260 that can be displayed However, the reference image rendering engine may not interpret character encodings or perform contextual form processing (described below). Thus, scalable vector reference images may provide reliable referents for comparing to text rendering engine results.

Reference images may be produced by a text rendering engine that is known to produce correct images. However, when working with a new language or set of typographic rules for which no rendering engine is yet available, reference images may be produced by scanning characters hand-drawn by a native speaker, or by scanning and cropping appropriate portions of a printed text. Later, when development on the text rendering engine has proceeded further, these hand-drawn or cropped images may be replaced by rendering-engine-generated reference images.

Figure 3:
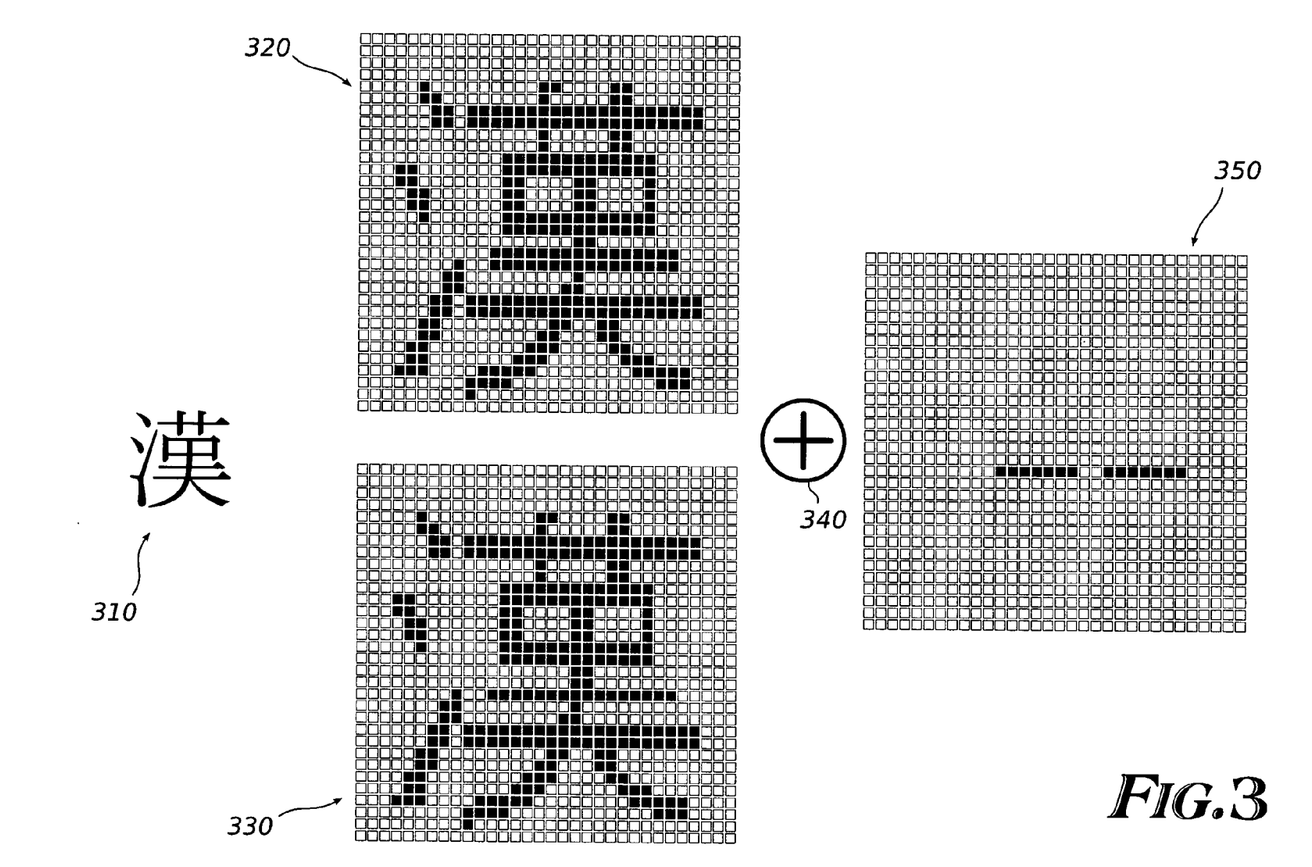
FIG. 3 shows how some text rendering results may be checked automatically in some embodiments of the invention.

FIG. 3 shows a character 310 that may appear in Japanese and/or Chinese text. A text rendering engine may process character codes corresponding to character 310 and produce a corresponding image 320 (neither the text rendering engine nor the character codes are shown in this Figure). A reference image 330 may be retrieved from a file, database or other storage facility. The rendered image 320 and reference image 330 may be compared automatically, as indicated by exclusive-OR ("XOR") symbol 340, to produce a difference image 350. If the rendered and reference images were identical, the difference image would be blank. However, in this Figure, the reference image 330 is slightly different from the rendered image 320 (a horizontal line in the character is thinner in the reference image). Therefore, the difference image 350 contains some black pixels where the rendered and reference images differ.

Automatic character comparison, as explained with reference to FIG. 3, can be used to reduce the burden of manually reviewing hundreds or thousands of unfamiliar character shapes. Any text characters for which the text rendering engine reproduces the reference image identically need not be presented to an operator for confirmation. Furthermore, in some embodiments, the number of different pixels between the rendered image and the reference image may be counted, and differences of less than a configurable threshold may be considered insignificant and not deserving of manual review. For example, if fewer than 5% of the pixels are different, the text rendering engine may be deemed to have correctly rendered the character.

Note that many text rendering systems use a technique called anti-aliasing to improve the visual (on-screen) appearance of text. These techniques often involve producing pixels in colors besides black and white. For example, a group of pixels at a curved edge of a character may be colored lighter or darker gray to reduce a "blocky" or "jaggy" appearance of the character. These intermediate-colored pixels may cause difficulty for automatic character comparison, if it is unclear whether a gray pixel should be considered to be different from a black or white pixel. In some embodiments, the output of a text rendering engine may be subjected to process to remove anti-aliasing effects so that the rendered text may be more reliably compared with the reference image.

Figure 4:
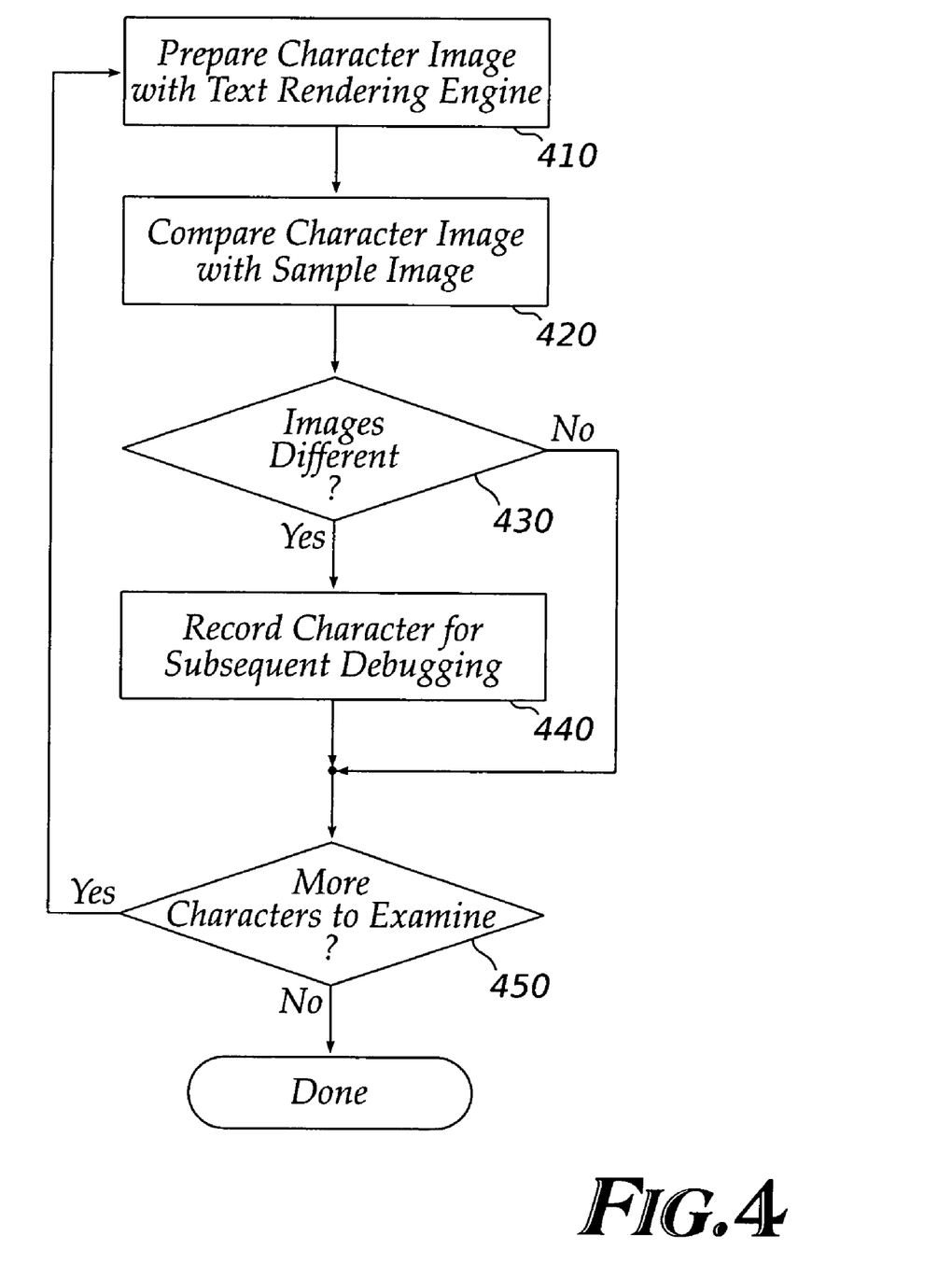
FIG. 4 is a flow chart of a process according to an embodiment of the invention.

FIG. 4 is a flow chart outlining operations according to an embodiment of the invention. First, a character image is prepared with a text rendering engine (410). For example, a character code (or code sequence) may be provided to the engine, along with information about the language, the font and color, a desired rendering resolution, and so on. The rendering engine produces a corresponding character image.

The rendered character image is compared with a sample image that represents to the desired appearance of the character (420). The comparison may be done automatically (in which case the character and reference image need not be displayed at all), or the rendered character image and reference image may be presented on a screen so that a visual comparison may be made by an operator. If the images are different (430), information about the character is recorded for subsequent debugging (440). For example, the character code or codes, the language, the rendered character image, and/or the reference image may be stored. Finally, if there are more characters to examine (450), the process is repeated.

Figure 5:
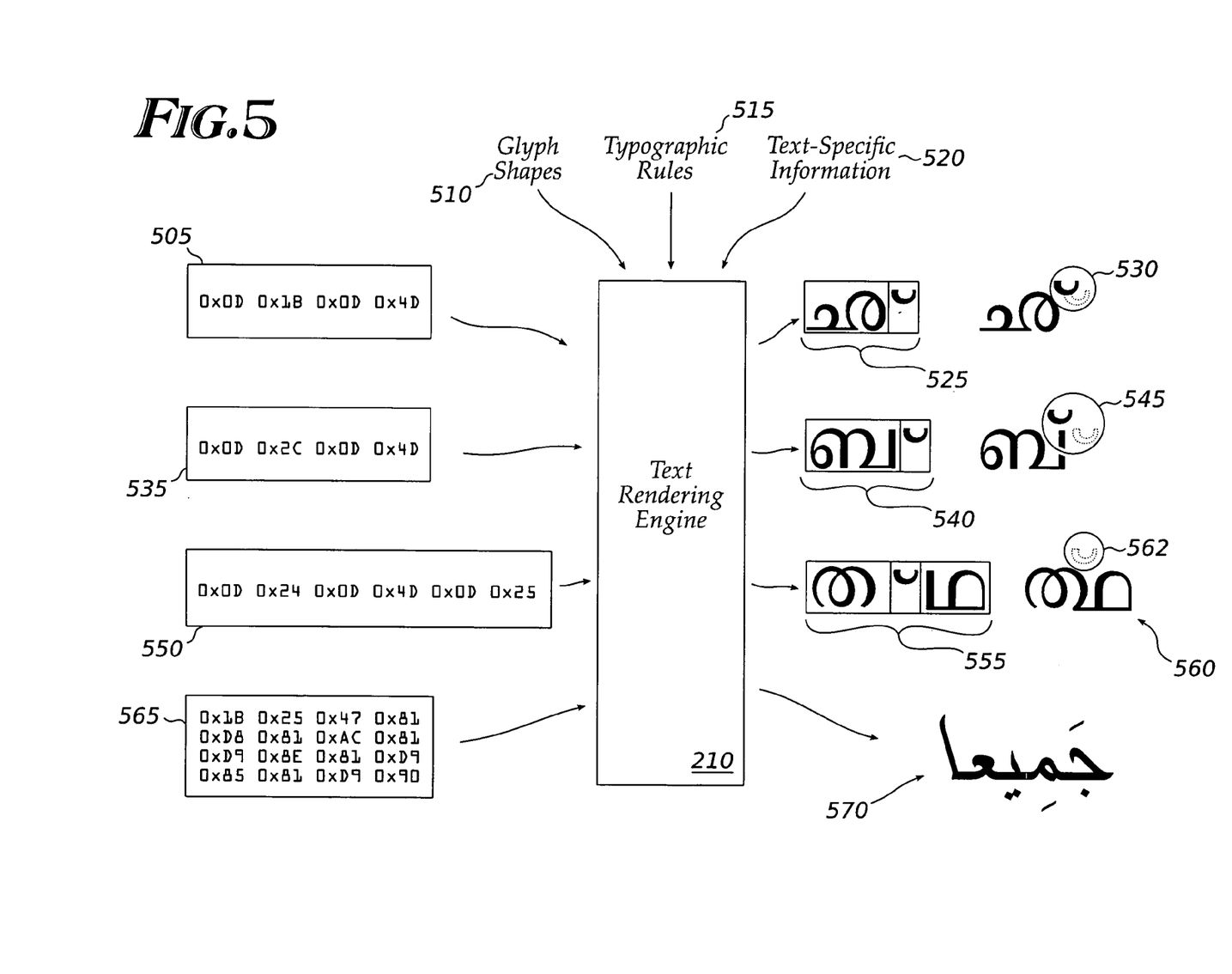
FIG. 5 shows another facet of text rendering that can be checked using an embodiment of the invention.

The foregoing material has largely focused on the rendering of individual characters, or "glyphs." However, as mentioned initially, many writing systems include typographic rules that require character sizes, shapes and/or positions to change based on adjacent or nearby characters, on the position of the character within a word, or according to the character's proximity to the beginning of a line or page. Text rendering engines should implement these rules, and it is important to confirm that the implementations perform correctly. FIG. 5 shows some examples of multi-character rendering issues that may arise in some contexts. Embodiments of the invention are useful in validating a rendering engine's performance.

A text rendering engine 210 may be presented with a variety of encoded text strings 505, 535, 550 and 565. The text rendering engine refers to the encoded text string and other information such as glyph shapes data 510, typographic rules 515 applicable to a particular natural language, and text-specific information 520 to produce rendered text. As shown in this Figure, text string 505 may encode the two glyphs shown at 525, but typographic rules 515 may direct the rendering engine to move the second glyph up and to the left slightly, as shown at 530, to produce the final rendered text. A similar text string 535 may encode the two glyphs shown at 540; with these two glyphs, the typographic rules 515 may direct that the second character be moved further up and to the left so that it appears over the first glyph's vertical line (545). In some cases, glyphs may even be omitted from the final output. This is illustrated by the encoded text 550. Three glyphs 555 are encoded, but typographic rules 515 instruct the rendering engine to produce the connected form shown at 560, with the small "U"-shaped element removed entirely (562).

An even longer encoded text string 565 may, after the application of appropriate typographic rules, produce the large rendered image at 570, including several dots and diacritical marks placed based on the sequence of individual characters in the input string. Embodiments of the invention compare the rendered multi-character texts with corresponding reference images to confirm that the text rendering engine is correctly applying the typographic rules for the language. As in the single-character case, comparisons may be done automatically or manually, and in the latter case, no semantic understanding of the language is required to evaluate the rendered text.

Figure 6:
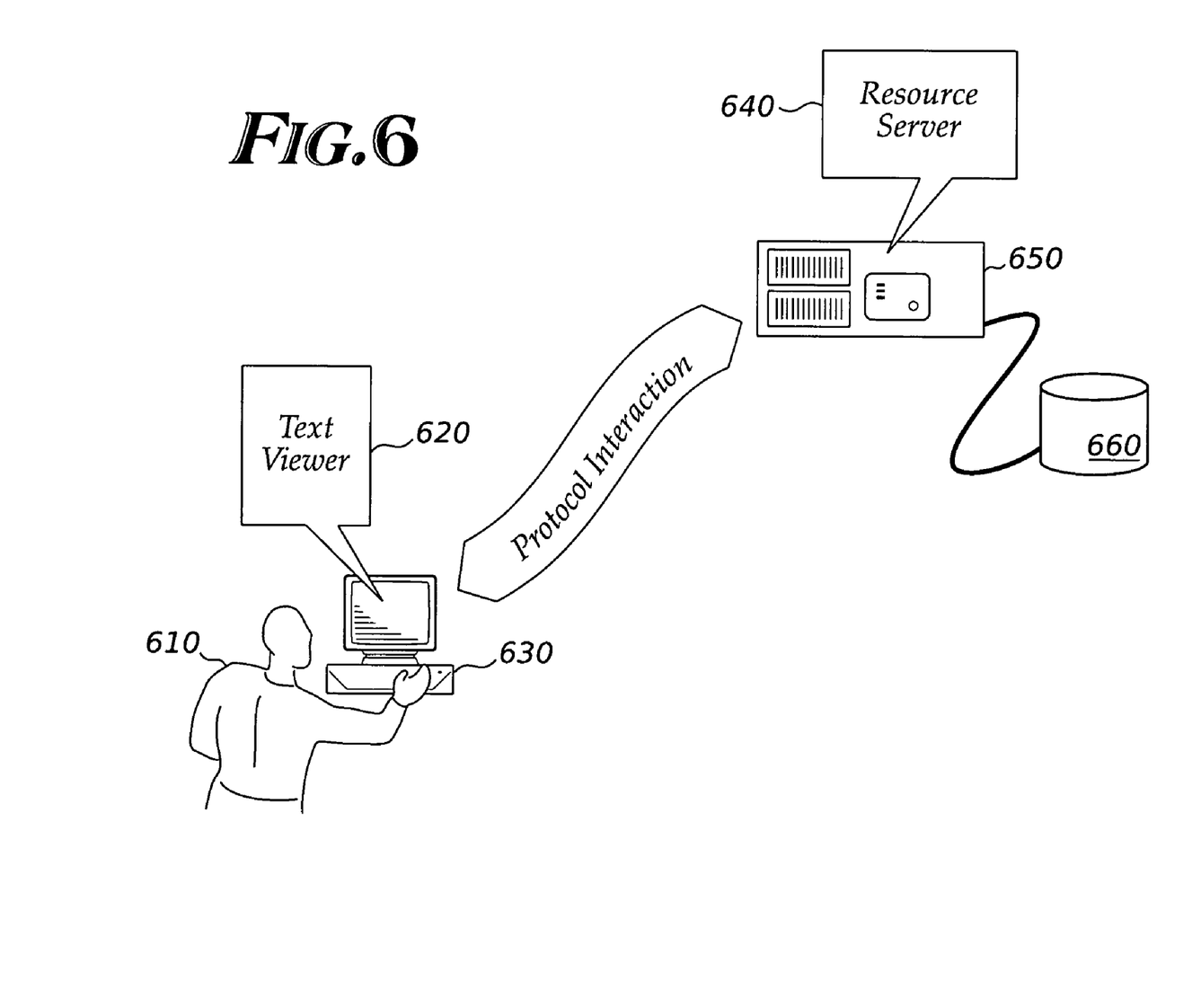
FIG. 6 shows a system suitable for supporting an embodiment of the invention.

FIG. 6 shows an environment where an embodiment of the invention may be used. An operator 610 uses a text viewing program 620 at a first computing system 630. The text viewer 620 uses the text rendering engine to be tested (not shown) to present text on system 630's display. System 630 interacts with a resource server 640 at another computer system 650. Resource server 640 supplies information such as encoded text strings and corresponding reference images to text viewer 620, and also collects manual or automatic comparison results. Encoded strings, reference characters, and comparison results may all be stored on a mass storage device 660. Although two separate computer systems 630 and 650 are shown in this Figure, those of skill in the relevant arts will appreciate that both the text viewer 620 and resource server 640 could execute on a single computer (for example, under the control of a multitasking operating system).

Text viewer 620 may be any program that uses a text rendering engine to display text to a user. For example, a word processor or web browser could be used to display a document containing encoded test text and the corresponding reference images. An operator can visually compare the displayed text with the corresponding reference images to identify text rendering errors. In some environments, different programs may use different text rendering engines to display text data. Under the Linux® operating system, most text rendering is performed by one of four different text rendering engines: the Pango system (used by some versions of the Mozilla and Firefox web browsers), the Gecko system (used by other versions of Mozilla), the Qt system (used by the Konqueror web browser), or the ICU system (used by the OpenOffice suite of programs). Under the Windows® operating system, most text rendering is performed by the Unis-cribe engine. To test any particular text rendering engine, one may load a document that contains or refers to the encoded text strings and the reference images into a program that uses the text rendering engine. Very few general-purpose programs need to use more than one text rendering engine, but a test program can be implemented that relies on two, three or more rendering engines. Such a test program can present several text rendering engine results side-by-side with a reference image to permit rendering engine performance to be compared directly.

Figure 7:
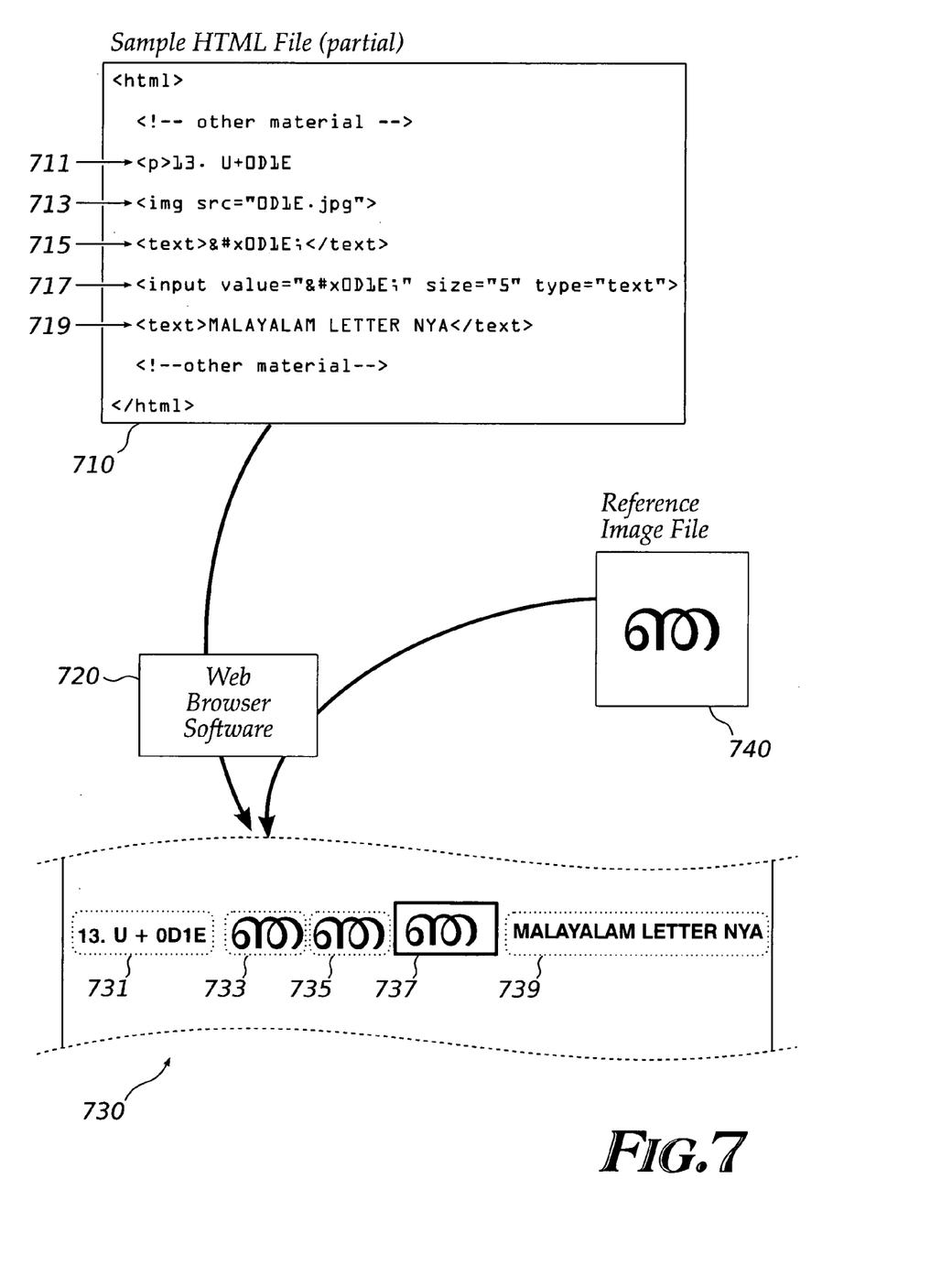
FIG. 7 shows one way to specify data and instructions in accordance with an embodiment of the invention.

FIG. 7 shows a portion of a Hypertext Markup Language ("HTML") file 710 that may be loaded into an HTML viewer program 720 such as Mozilla, Firefox, Opera, Konqueror or Internet Explorer. The file contains HTML directives that cause the HTML viewer program 720 to display certain text strings and images. Thus, although HTML is not what is traditionally thought of as an "executable file," it does contain data and instructions that are processed by the HTML viewer program 720, and that ultimately result in a programmable processor (i.e., central processing unit or "CPU") of the system performing certain operations according to an embodiment of the invention.

The sample HTML file 710 shown here may cause an HTML viewer program 720 to produce a display screen containing a portion resembling element 730. Line 711 causes the HTML viewer to display an indexing aid 731. Line 713 causes the HTML viewer to retrieve a reference image from reference image file 740 and display it as 733. Line 715 causes the HTML viewer to display encoded text 735, and line 717 causes the HTML viewer to display a text input field 737 containing the same encoded text. Elements 735 and 737 are both prepared by the text rendering engine used by the HTML viewer. Line 719 of the HTML file causes HTML viewer 720 to display additional information 739 describing the character whose rendering is being tested.

Although not shown in FIG. 7, those of ordinary skill in the relevant arts will recognize that HTML file 710 may contain user-selectable Boolean controls (e.g., checkboxes) and a "submit" control, to cause HTML viewer 720 to transmit information such as a character code and the user's evaluation of the corresponding character to a server for further analysis.

Figure 8:
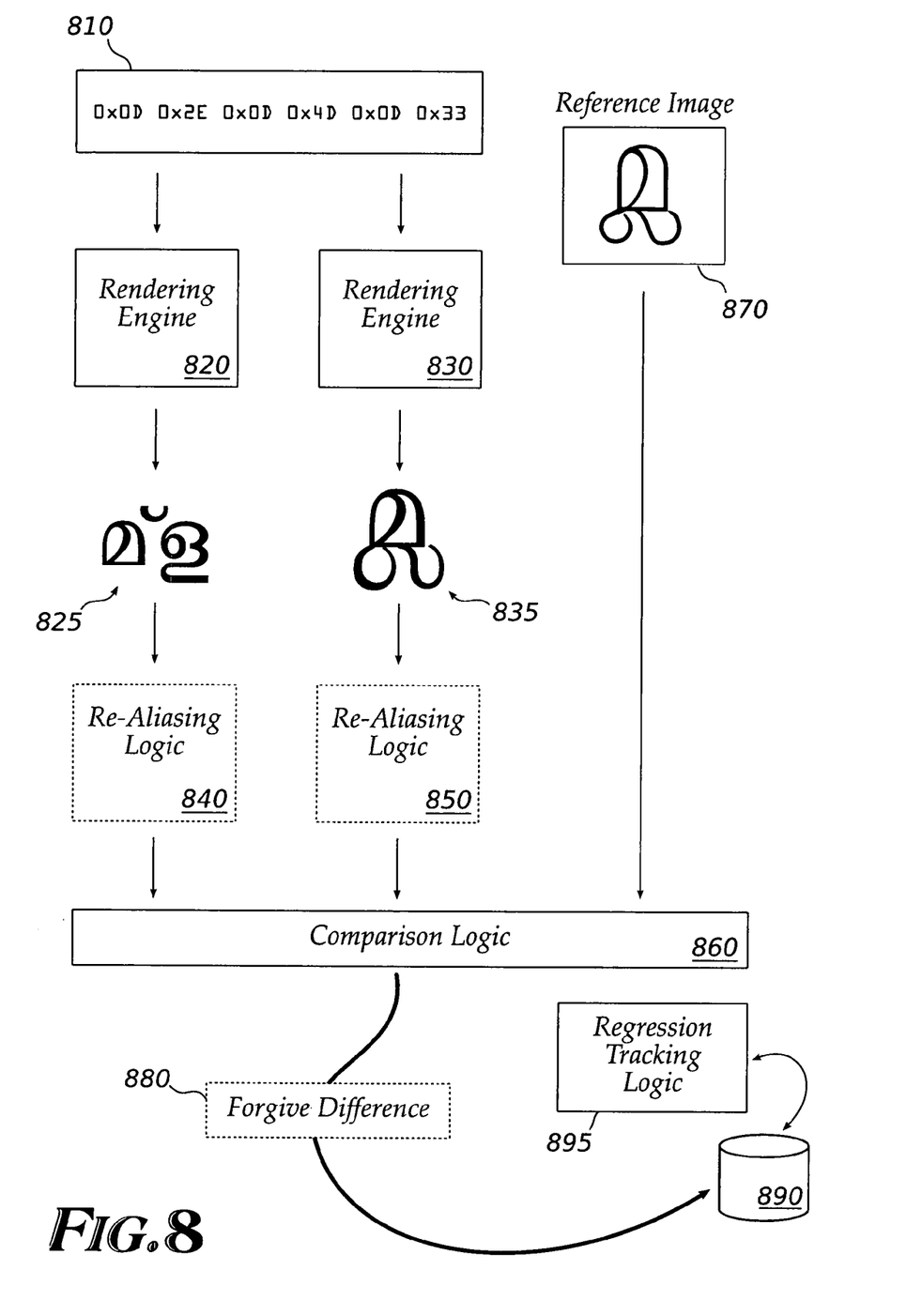
FIG. 8 shows some logical blocks that interact according to an embodiment.

FIG. 8 shows some data flows and logic blocks of an automatic text rendering engine test system that can test a plurality of rendering engines simultaneously. An encoded text string 810 is provided to each of the rendering engines 820, 830, which produce the results shown at 825 and 835, respectively. One or both results may be processed by re-aliasing logic 840, 850 to remove any anti-aliasing effects supplied by the corresponding rendering engine. (The reasons for this processing operation were described earlier.) The rendered and (possibly) re-aliased characters are compared with a reference image 870 by comparison logic 860. In this example, note that the rendered text image 825 produced by rendering engine 820 is significantly different from the reference image 870. Rendered text image 835 is similar, but not pixel-for-pixel identical. Therefore, an embodiment of the invention may consider both rendering engines to have failed to render the encoded text string 810 properly. Alternatively, in some embodiments, the rendered text strings and reference image may be displayed to an operator, who may determine that rendered text 835 is sufficiently similar to reference image 870 to be considered "passing." Thus, in this embodiment, the operator may forgive the differences between 835 and 870 (880). Rendering and comparison results may be stored in a database or other mass storage system 890, where regression tracking logic 895 may review them to determine whether modifications of rendering engine 820 and/or 830 improved or damaged the engines' performance.

An embodiment of the invention may be a machine-readable medium having stored thereon data and instructions to cause a programmable processor to perform operations as described above. In other embodiments, the operations might be performed by specific hardware components that contain hardwired logic. Those operations might alternatively be performed by any combination of programmed computer components and custom hardware components.

Instructions for a programmable processor may be stored in a form that is directly executable by the processor ("object" or "executable" form), or the instructions may be stored in a human-readable text form called "source code" that can be automatically processed by a development tool commonly known as a "compiler" to produce executable code. Instructions may also be specified as a difference or "delta" from a predetermined version of a basic source code. The delta (also called a "patch") can be used to prepare instructions to implement an embodiment of the invention, starting with a commonly-available source code package that does not contain an embodiment. As mentioned above, Hypertext Markup Language ("HTML") documents are also instructions and data that cause a programmable processor to perform operations according to an embodiment of the invention.

In the preceding description, numerous details were set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions were presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, compact disc read-only memory ("CD-ROM"), and magnetic-optical disks, read-only memories (ROMs), random access memories (RAMs), eraseable, programmable read-only memories ("EPROMs"), electrically-eraseable read-only memories ("EEPROMs"), magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.)), etc.

The applications of the present invention have been described largely by reference to specific examples and in terms of particular allocations of functionality to certain hardware and/or software components. However, those of skill in the art will recognize that multilingual text sample rendering and evaluation can also be implemented by software and hardware that distribute the functions of embodiments of this invention differently than herein described. Such variations and implementations are understood to be captured according to the following claims.

We claim:

1. A method comprising:
  supplying a character code to a text rendering engine being tested to cause the text rendering engine to render a character corresponding to the character code,
  identifying a graphical reference image for the character, wherein the graphical reference image was produced by a source known to produce correct images;
  presenting the graphical reference image and the rendered character on a bitmapped display screen of a computer system to facilitate a visual comparison between a visual representation of the graphical reference image produced by the source known to produce correct images and a visual representation of the rendered character produced by the text rendering engine to be tested;
  receiving, by the computer system, user input indicating user evaluation of the graphical reference image and the rendered character, the user evaluation being based on the comparison between the visual representation of the graphical reference image and the visual representation of the rendered character, the user evaluation identifying one or more differences between the graphical reference image produced by the source known to produce correct images and the rendered character produced by the text rendering engine to be tested; and storing, by the computer system, the user evaluation in a database for subsequent debugging of the text rendering engine.

2. The method of claim 1, further comprising:
presenting an array containing a plurality of rows, each row including an indexing aid, a graphical reference image and a rendered character, on the bitmapped display screen;
collecting an evaluation of the graphical reference image and the rendered character on each row; and
storing the evaluations in the database.

3. The method of claim 1 further comprising:
presenting an indexing aid, the graphical reference image and a second rendered character drawn by a second rendering engine, on the bitmapped display screen.

4. The method of claim 1, further comprising:
preparing a report based on the evaluation in the database, the report to identify the graphical reference image and the rendered character that were evaluated to be dissimilar.

5. The method of claim 1, wherein a difference between the graphical reference image and the rendered character indicates at least one of an error in the graphical reference image, an error in encoding the rendered character, an error in a font of the rendered character or an error in a text rendering process.

6. The method of claim 1 further comprising:
automatically comparing the graphical reference image with the rendered character; and
if the graphical reference image is different from the rendered character, storing a plurality of data bytes associated with the rendered character in the database.

7. The method of claim 6 wherein the rendered character is produced based on information including the plurality of data bytes, a font and a set of typographical rules of a natural language of a non-Latin alphabet.

8. The method of claim 7 wherein the natural language is one of Assamese, Bengali, Bodo, Dogri, Gujarati, Kannada, Kashmiri, Konkani, Maithili, Malayalam, Manipuri, Marathi, Nepali, Oriya, Punjabi, Sanskrit, Santhali, Sindhi, Tamil, Telugu, Urdu or Hindi.

9. The method of claim 1 wherein presenting the graphical reference image comprises issuing a request to a Hypertext Transfer Protocol ("HTTP") server to obtain the reference image.

10. The method of claim 9 wherein the reference image is one of a Graphics Interchange Format ("GIF") file, a Joint Photographic Experts Group ("JPEG") file, a Portable Network Graphics ("PNG") file or a Scalable Vector Graphics ("SVG") file.

11. A system comprising:
a memory to store a graphical reference image for a rendered character, the graphical reference image was produced by a source known to produce correct images;
a display device, coupled to the memory, the display device providing a bitmapped display screen to present the graphical reference image and the rendered character produced by a text rendering engine being tested to facilitate a visual comparison between a visual representation of the graphical reference image produced by the source known to produce correct images and a visual representation of the rendered character produced by the text rendering engine to be tested; and
a processor, coupled to the memory and the display device, to receive user input indicating user evaluation of the graphical reference image and the rendered character, the user evaluation being based on the comparison between the visual representation of the graphical reference image and the visual representation of the rendered character, the user evaluation identifying one or more differences between the graphical reference image produced by the source known to produce correct images and the rendered character produced by the text rendering engine to be tested, and to store the user evaluation in a database for subsequent debugging of the text rendering engine.

12. The system of claim 11 wherein:
the bitmapped display screen is to further present an array containing a plurality of rows, each row including an indexing aid, a graphical reference image and a rendered character, on the bitmapped display screen; and
the processor is to collect an evaluation of the graphical reference image and the rendered character on each row, and to store the evaluations in the database.

13. The system of claim 11 further comprising:
a first rendering engine to draw the rendered character; and
a second rendering engine to presenting an indexing aid, the graphical reference image and a second rendered character on the bitmapped display screen.

14. The system of claim 11, wherein a difference between the graphical reference image and the rendered character indicates at least one of an error in the graphical reference image, an error in encoding the rendered character, an error in a font of the rendered character or an error in a text rendering process.

15. A non-transitory computer-readable storage medium including data that, when accessed by a processor, cause the processor to perform a method comprising:
supplying a character code to a text rendering engine being tested to cause the text rendering engine to render a character corresponding to the character code,
identifying a graphical reference image for the character, wherein the graphical reference image was produced by a source known to produce correct images;
presenting the graphical reference image and the rendered character on a bitmapped display screen of a computer system to facilitate a visual comparison between a visual representation of the graphical reference image produced by the source known to produce correct images and a visual representation of the rendered character produced by the text rendering engine to be tested;
receiving, by the computer system, user input indicating user evaluation of the graphical reference image and the rendered character, the user evaluation being based on the comparison between the visual representation of the graphical reference image and the visual representation of the rendered character, the user evaluation identifying one or more differences between the graphical reference image produced by the source known to produce correct images and the rendered character produced by the text rendering engine to be tested; and
storing, by the computer system, the user evaluation in a database for subsequent debugging of the text rendering engine.

16. The computer-readable storage medium of claim 15, wherein the method further comprises:
presenting an array containing a plurality of rows, each row including an indexing aid, a graphical reference image and a rendered character, on the bitmapped display screen;
collecting an evaluation of the graphical reference image and the rendered character on each row; and
storing the evaluations in the database.

17. The computer-readable storage medium of claim 15, wherein a difference between the graphical reference image and the rendered character indicates at least one of an error in the graphical reference image, an error in encoding the rendered character, an error in a font of the rendered character or an error in a text rendering process.

18. The computer-readable storage medium of claim 15, wherein the evaluation is performed by a user who is unable to read a natural language associated with the rendered character and the graphical reference image.

* * * * *